United States Patent
Magi et al.

(10) Patent No.: US 9,599,436 B2
(45) Date of Patent: Mar. 21, 2017

(54) EXTERNAL VISION AND/OR WEAPON AIMING AND FIRING SYSTEM FOR MILITARY LAND VEHICLES, MILITARY AIRCRAFT AND MILITARY NAVAL UNITS

(71) Applicant: SELEX ES S.p.A., Rome (IT)

(72) Inventors: Andrea Magi, Rome (IT); Nicola Pagliani, Rome (IT)

(73) Assignee: SELEX ES S.p.A., Rome (IT)

( * ) Notice: Subject to any disclaimer, the term of this patent is extended or adjusted under 35 U.S.C. 154(b) by 52 days.

(21) Appl. No.: 14/845,017

(22) Filed: Sep. 3, 2015

(65) Prior Publication Data
US 2016/0069645 A1    Mar. 10, 2016

(30) Foreign Application Priority Data
Sep. 4, 2014    (IT) .............................. TO2014A0696

(51) Int. Cl.
*F41G 3/16* (2006.01)
*F41G 1/32* (2006.01)
*F41G 3/22* (2006.01)

(52) U.S. Cl.
CPC .............. *F41G 3/165* (2013.01); *F41G 1/32* (2013.01); *F41G 3/22* (2013.01)

(58) Field of Classification Search
CPC .............. F41G 3/165; F41G 3/22; F41G 1/32
USPC ....................................................... 348/148
See application file for complete search history.

(56) References Cited

U.S. PATENT DOCUMENTS

| | | | |
|---|---|---|---|
| 4,570,530 A | 2/1986 | Armstrong | |
| 2007/0279494 A1* | 12/2007 | Aman ................... | G01S 3/7864 348/169 |
| 2009/0195652 A1* | 8/2009 | Gal .......................... | B60R 1/00 348/148 |
| 2010/0013615 A1* | 1/2010 | Hebert ................... | B60Q 9/006 340/425.5 |
| 2013/0021528 A1* | 1/2013 | Liu ......................... | G01J 3/462 348/675 |

FOREIGN PATENT DOCUMENTS

FR        2699658 A1    6/1994

* cited by examiner

*Primary Examiner* — Zhihan Zhou
(74) *Attorney, Agent, or Firm* — Seed IP Law Group LLP

(57) ABSTRACT

The disclosure concerns an external vision and/or weapon aiming and firing system for a military land vehicle and/or a military aircraft and/or a military naval unit. The system comprises: a video capture device configured to capture a video stream of a scene outside the military land vehicle or the military aircraft or the military naval unit; an electronic control unit configured to insert an aiming reticle in the images of said video stream, thereby generating a corresponding output video stream; and a user interface configured to display the output video stream generated by the electronic control unit. The electronic control unit is programmed to automatically change the color of the aiming reticle so as to maximize its contrast with respect to a predefined region of the images of the video stream centerd on said aiming reticle.

9 Claims, 4 Drawing Sheets

EXTERNAL VISION AND/OR WEAPON AIMING AND FIRING SYSTEM FOR MILITARY LAND VEHICLES, MILITARY AIRCRAFT AND MILITARY NAVAL UNITS

BACKGROUND

Technical Field

The present disclosure relates to an external vision and/or weapon aiming and firing system for military land vehicles (such as armoured military vehicles, tanks, mine-clearance vehicles, armed land vehicles, etc.), for military aircraft (such as military aeroplanes and helicopters) and for military naval units (such as cruisers, patrol boats, corvettes, etc.).

With regard to this, the present disclosure will hereinafter be described, for simplicity, by making explicit reference only to military land vehicles without, however, any loss of generality. In fact, it is important to underline that the external vision and/or weapon aiming and firing system according to the present disclosure can also be advantageously exploited on board military aircraft and/or military naval units without having to make any substantial changes to the operation and architecture of said system.

Description of the Related Art

As is known, nowadays military land vehicles are generally equipped with indirect external vision systems, i.e. where vision of the outside surroundings captured via optoelectronic devices is made available to an operator on board the military vehicle via a user interface, which generally comprises at least one screen.

For example, such indirect external vision systems can be opportunely configured to capture video, i.e. sequences of images, of the outside surroundings in the visible spectrum (i.e. at wavelengths ranging between approximately 380/400 nm and 700/750 nm) and/or in the infrared spectrum (i.e. at wavelengths ranging between approximately 0.7/0.75 μm and 1000 μm).

In general, an external vision system of a military land vehicle comprises:
- one or more video capture device(s) installed on the outside of the military land vehicle, each video capture device being configured to capture a respective video stream, i.e. a respective sequence of images, of the surroundings outside the military land vehicle, for example in the visible or infrared spectrum;
- an electronic control unit installed on board the military land vehicle, connected to the video capture device(s) to receive the video stream(s) generated by said video capture device(s) and configured to process said video stream(s) and to control operation and aiming of the sensor(s); and
- a user interface installed inside the crew compartment of the military land vehicle, connected to the control unit and configured to display the processed video stream(s) provided by said control unit.

In general, the user interface comprises:
- a screen configured to display the processed video stream provided by the control unit; and
- user control means configured to enable an operator to control, i.e. operate, the external vision system.

In general, the electronic control unit inserts an aiming reticle in the images of the video stream displayed by the user interface to indicate the aiming direction of the video capture device that generated said displayed video stream. In general, the aiming reticle is inserted in the images of the displayed video stream using graphical overlay techniques.

The user interface can be installed in various positions inside the crew compartment of the military vehicle, for example in the commander's station of the military vehicle.

Generally, in the case of a military vehicle equipped with a weapon, for example, in the case of a tank or an infantry combat vehicle, an external vision system is operationally associated with said weapon so as to enable an operator to control its aiming and firing, the end result being that said external vision system also acts as an aiming and firing system for said weapon. In this case:
- at least one video capture device is coupled to said weapon in order to capture a video stream of the surroundings outside the military vehicle in a direction in which said weapon is aimed;
- the user control means are configured to enable an operator to also control the aiming and firing of the weapon;
- the electronic control unit is configured to
- also control the aiming and firing of the weapon, and
- insert an aiming reticle in the images of the video stream acquired from the video capture device that indicates the direction in which the weapon is aimed (and therefore also the aiming direction of said video capture device); and
- the user interface can be opportunely installed inside the crew compartment of the military vehicle in an artilleryman's/gunner's station.

The user control means can opportunely include:
- a control stick or joystick configured to enable an operator to control,
- in the case of a mere external vision system, the aiming of the video capture device(s), or,
- in the case of an external vision and weapon aiming and firing system, the aiming of the weapon and the video capture device coupled to it; and
- a push-button control panel (which, for example, could be opportunely provided on the edges of the screen or on a control panel separate from the screen), configured to enable an operator to control
- operation of the external vision system (or the external vision and weapon aiming and firing system) and,
- in the case of an external vision and weapon aiming and firing system, also the operation of said weapon.

In particular, the push-button control panel could be opportunely configured to send respective commands, when operated by an operator, to the electronic control unit, which is consequently configured to control, on the basis of commands received from the push-button control panel (or, more in general, on the basis of commands imparted by an operator through the user control means), operation of
- the external vision system (or the external vision and weapon aiming and firing system), and
- also the weapon in the case of an external vision and weapon aiming and firing system.

Alternatively, instead of the screen and push-button control panel, the user interface could include a touch screen configured to perform the function of both the screen and the push-button control panel.

In general, external vision and/or weapon aiming and firing systems of the above-stated type are configured to allow an operator to select the colour of the aiming reticle.

In fact, the aiming reticle colour is a parameter of fundamental importance in order to allow accurate tracking of a target and/or an element of interest. In fact, the tracking of a target could be particularly difficult in the case where the aiming reticle has a colour easily confused with that of the target (or that of the background in the displayed video stream), for example, in the case of a bright-coloured target and a white aiming reticle, or in the case of a dark-coloured target and a black aiming reticle.

As previously described, current external vision and/or weapon aiming and firing systems are configured to allow an operator to manually select the colour of the aiming reticle. Therefore, in cases where the aiming reticle colour does not allow accurate tracking of a target, an operator is forced to manually change the colour of the aiming reticle (for example, via the user control means of the user interface) in order to make it more visible with respect to the target and/or the background in the displayed video stream. However, this procedure can delay target engagement and this delay could even become fatal for those on board the military vehicle.

Furthermore, with current external vision and/or weapon aiming and firing systems, the rapid engagement of close multiple targets having opposite colour polarities can be very difficult, if not even impossible.

French patent application FR 2 699 658 A1 describes a stabilized aiming system for a weapon (for example, a rifle). In particular, the system described in FR 2 699 658 A1 includes a screen and processing circuitry that is configured to automatically change the colour or shade of grey of an aiming reticle displayed on the screen in order to obtain the best contrast possible between said reticle and the images observed. In detail, in the case of grey-scale images, the automatic modification of the aiming reticle's shade of grey is based on calculating an average of the greyscale values of the pixels positioned around the aiming reticle, where the average is weighted by the use of decreasing weights as the distance of the pixels from the reticle increases. Instead, in the case of colour images, FR 2 699 658 A1 limits itself to just affirming that the contrast improvement procedure can also be used in the case of a colour screen by introducing the use of a colour contrast matrix.

The algorithm described in FR 2 699 658 A1 is based exclusively on a modulation of the reticle's luminance value. This choice does not enable having clear vision of the reticle in certain operational scenarios.

Furthermore, it is important to note that FR 2 699 658 A1 does not actually describe any procedure for automatically changing the colour of the aiming reticle in the case of colour images, nor even teaching how it is possible to determine the colour to assign to the reticle.

BRIEF SUMMARY

As is known, it is increasingly important in present-day military scenarios to react to possible menaces in the least possible time and with the greatest possible precision. In particular, it is fundamental to able to track and, if necessary, engage any hostile targets with the greatest possible efficiency, i.e. with the greatest possible precision and minimizing reaction times as much as possible. For example, in the case of a military land vehicle that operates in a hostile environment, the efficiency with which possible hostile targets are tracked and, if necessary, engaged is a crucial factor for the safety of said vehicle and, consequently, for the safety of the military personnel on board that vehicle.

Therefore, the applicant has carried out in-depth research in order to develop an external vision and/or weapon aiming and firing system for military land vehicles, military aircraft and military naval units that was capable of ensuring high efficiency tracking and/or engagement of possibly hostile targets.

A first object of the present disclosure is therefore that of providing an external vision and/or weapon aiming and firing system for military land vehicles, military aircraft and military naval units that is capable of ensuring high efficiency in tracking and/or engagement of possibly hostile targets.

Furthermore, a second object of the present disclosure is that of providing an external vision and/or weapon aiming and firing system that, in general, enables an operator using said system to always operate under the best possible visual conditions and, in particular, overcomes the above-stated technical problems of current external vision and/or weapon aiming and firing systems related to the manual selection/setting of the aiming reticle colour.

These and other objects are achieved by the present disclosure in so far as it relates to an external vision and/or weapon aiming and firing system for military land vehicles, military aircraft and military naval units, as defined in the appended claims.

In particular, the present disclosure concerns an external vision and/or weapon aiming and firing system designed to be installed on board a military land vehicle and/or a military aircraft and/or a military naval unit, and comprising:

a video capture device configured to capture a video stream of a scene outside the military land vehicle or the military aircraft or the military naval unit, said video stream comprising a sequence of colour images in which the colour of the pixels of said images is expressed in a predefined RGB colour space in terms of red, green and blue colour components;

an electronic control unit connected to the video capture device to acquire the video stream captured by the latter and configured to insert an aiming reticle in the images of said video stream that indicates the aiming of the video capture device and/or of a weapon installed on board the military land vehicle or the military aircraft or the military naval unit, thereby generating a corresponding output video stream; and a user interface connected to the electronic control unit to receive the output video stream generated by the latter and which is configured to display the received video stream.

The system according to the present disclosure is characterized in that the electronic control unit is programmed to:

automatically change the colour of the aiming reticle by performing the following operations transforming, for an image of the video stream acquired from the video capture device, the red, green and blue colour components of pixels located in a predefined region of said image into components L*, a* and b* expressed in the CIE L*a*b* colour-opponent space, wherein said predefined region is centred on the aiming reticle, computing average values of the components L*, a* and b* of the pixels in the predefined region;

computing a colour saturation value and a hue angle on the basis of the average values of components a* and b* of the pixels in the predefined region, and selecting the colour of the aiming reticle on the basis of the computed colour saturation value, of the computed hue angle and of the average value of components L* of the pixels in the predefined region, so as to maximize colour contrast between said aiming reticle and the predefined region;

compute a value indicative of a colour difference between the predefined regions of two or more immediately consecutive images in the video stream acquired from the video capture device on the basis of the average values of the components L*, a* and b* of the pixels in said predefined regions; and change the colour of the aiming reticle only if the value indicative of said colour difference is equal to, or greater than, a predefined threshold.

Preferably, the electronic control unit is programmed to select, as the aiming reticle colour, a colour having maximum contrast with respect to a colour resulting from the computed hue angle, thereby maximizing the contrast between the aiming reticle and said predefined region.

The indicative value of said colour difference is expediently indicative of a Euclidean distance between the average values of the components L*, a* and b* of the pixels in the predefined regions of the two or more immediately consecutive images in the video stream acquired from the video capture device; furthermore, said predefined threshold is indicative of a user-perceptible colour difference.

BRIEF DESCRIPTION OF THE SEVERAL VIEWS OF THE DRAWINGS

For a better understanding of the present disclosure, some preferred embodiments, provided by way of non-limitative example, will now be described with reference to the accompanying drawings (not to scale), in which.

DETAILED DESCRIPTION

The following description is provided to enable an expert in the field to embody and use the disclosure. Various modifications to the embodiments shown will be immediately obvious to experts and the generic principles described herein could be applied to other embodiments and applications without, however, departing from the scope of the present disclosure as defined in the appended claims.

Therefore, the present disclosure should not be intended as limited to just the embodiments described and illustrated, but is to be accorded the widest scope consistent with the principles and features disclosed herein and defined in the appended claims.

With regard to this, as previously stated, the present disclosure will, for simplicity, only be described hereinafter with reference to military land vehicles without, however, any loss of generality. In fact, the external vision and/or weapon aiming and firing system according to the present disclosure can also be advantageously exploited on board military aircraft and military naval units without having to make changes to the operations and architecture of said system.

In general, the present disclosure concerns an external vision and/or weapon aiming and firing system configured to implement automatic aiming reticle colour selection functionality, thanks to which said system, in use, automatically changes the colour of the aiming reticle, always using the most suitable colour, i.e. automatically selecting a colour such as to maximize the contrast between the aiming reticle and a predefined region of the images of the video stream centred on said reticle.

In this way, the system according to the present disclosure enables an operator to always work under the best possible visual conditions, avoiding any delay related to the operator manually selecting/setting the aiming reticle colour.

Figure 1:
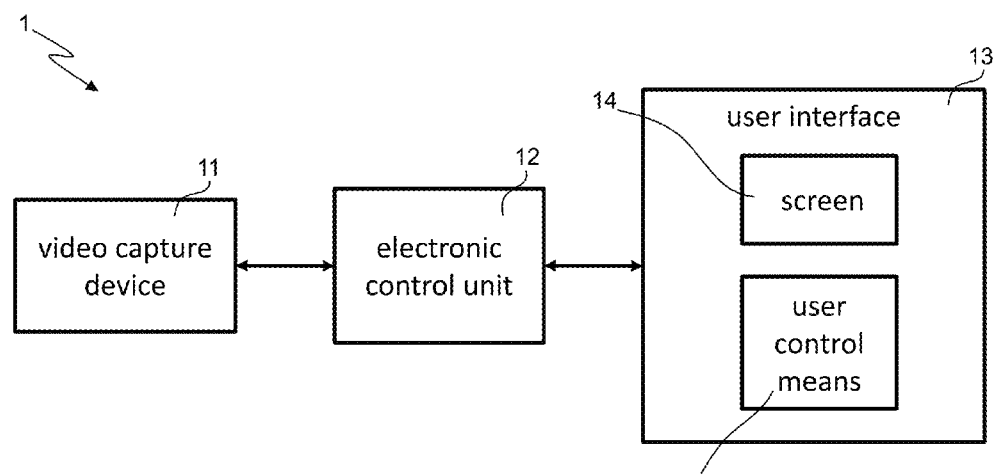
FIG. 1 schematically shows an example architecture of an external vision and/or weapon aiming and firing system for military land vehicles, military aircraft and military naval units according to a preferred embodiment of the present disclosure.

For a better understanding of the present disclosure, a block diagram is shown in FIG. 1 that represents an example architecture of an external vision and/or weapon aiming and firing system (indicated as a whole by reference numeral 1) for military land vehicles according to a preferred embodiment of the present disclosure.

In particular, the external vision and/or weapon aiming and firing system 1 is designed to be installed on board a military land vehicle (not shown in FIG. 1 for simplicity of illustration) and comprises:

at least one video capture device 11 that is installed on the outside of the military vehicle and is configured to capture a video stream, i.e. a sequence of images, of the surroundings outside the military land vehicle, for example in the visible or infrared spectrum, where the video stream generated, or rather captured, by said video capture device 11 comprises colour images;

an electronic control unit 12 that is installed on board the military land vehicle, is connected to the video capture device 11 to receive, or acquire/grab, the video stream generated, or captured, by the latter, and is configured to insert, opportunely via graphical overlay techniques, an aiming reticle in the images of said acquired video stream that indicates the aiming direction (or, more simply, the aiming) of said video capture device 11, thereby generating a corresponding output video stream, and control the operation and aiming of the video capture device 11; and a user interface 13 that is installed inside the crew compartment of the military vehicle, is connected to the control unit 12 to receive the output video stream generated by said control unit 12, and is configured to display the output video stream received from the electronic control unit 12.

As shown in FIG. 1, the user interface 13 preferably comprises:

a screen 14 configured to display the output video stream received from the electronic control unit 12; and user control means 15 configured to enable an operator to control the operation of the system 1.

The user interface 13 can be opportunely installed in various positions inside the crew compartment of the military vehicle, for example in the commander's station of said military vehicle.

Opportunely, in the case where the system 1 is installed on board a military land vehicle equipped with a weapon (for example a tank or armoured car or an infantry combat vehicle), said system 1 can be operationally associated with said weapon so as to enable an operator to control its aiming and firing, the end result being that said system 1, as well as acting as an external vision system, also acts as an aiming and firing system for said weapon.

In particular, in the case where the system 1 acts as an external vision and weapon aiming and firing system:

the video capture device 11 is coupled to said weapon in order to capture a video stream of the surroundings outside the military vehicle in a direction in which said weapon is aimed;

the user control means 15 are configured to enable an operator to control the operation of the system 1 and also the aiming and firing of the weapon; and the electronic control unit 12 is configured to control the operation of the video capture device 11 and the aiming and firing of the weapon, and insert an aiming reticle in the images of the video stream acquired from the video capture device 11 that indicates the direction in which the weapon is aimed (and therefore also the aiming direction of said video capture device 11).

Furthermore, always in the case where the system 1 acts as an external vision and weapon aiming and firing system, the user interface 13 can be opportunely installed inside the crew compartment of the military vehicle in an artilleryman's/gunner's station.

According to a primary aspect of the present disclosure, the electronic control unit 12 is configured, in particular is programmed via opportune software and/or firmware code, to implement the above-stated automatic aiming reticle colour selection functionality.

In particular, the electronic control unit 12 can usefully comprise:

a Field Programmable Gate Array, programmed via opportune firmware code, to implement said automatic aiming reticle colour selection functionality; or a digital signal processor, programmed via opportune software code, to implement said automatic aiming reticle colour selection functionality.

In detail, the video stream generated by the video capture device 11 comprises colour images (for example, said video capture device 11 can usefully be a TV camera and the electronic control unit 12 is programmed to implement said automatic aiming reticle colour selection functionality by performing the following operations:

computing, for an image of the video stream acquired from the video capture device 11, reference colour components indicative of the average values of the colour components of pixels located in a predefined region of said image, where said predefined region is centred on the aiming reticle; and selecting, as the aiming reticle colour, a colour having maximum contrast with respect to a colour corresponding to (i.e. resulting from) the computed reference colour components, so as to maximise the contrast between the aiming reticle and said predefined region.

Under certain special conditions, the electronic control unit 12 might assign a different colour to the aiming reticle for each frame, or image, of the video stream, in this way creating colour jitter that could become quite fastidious for an operator.

Therefore, in order to avoid this problem, the electronic control unit 12 is preferably programmed to change the colour of the aiming reticle with a refresh rate for the aiming reticle colour lower than the frame rate fps of the video stream provided by the video capture device 11; said frame rate fps being, for example, expressed in terms of the number of frames per second.

The electronic control unit 12 is expediently programmed to change the colour of the aiming reticle with a refresh rate of the colour or grey-scale of the aiming reticle equal to fps/P, where P indicates an operational parameter having an integer value that depends on the standard/format and frame rate fps of the video stream provided by the video capture device 11; for example, if the video capture device 11 is configured to generate an analogue video stream in the PAL format, operational parameter P could be opportunely equal to five (i.e. P=5), while, if the video capture device 11 is configured to generate a digital video stream with high-definition and progressive scanning (720p HD Ready or 1080p Full HD), operational parameter P could be opportunely equal to ten (i.e. P=10).

Figure 2:
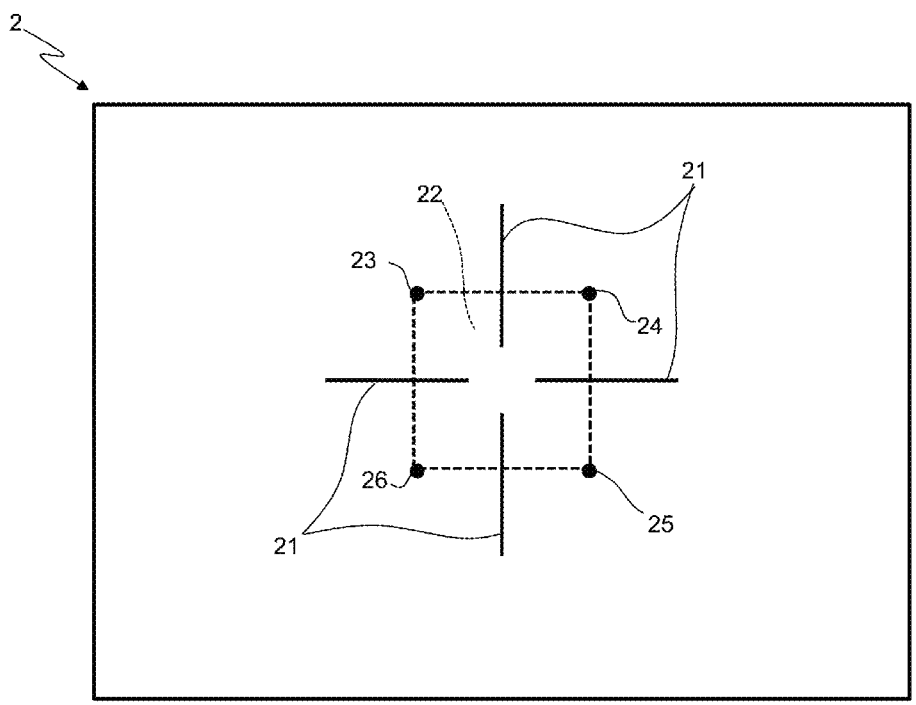
FIG. 2 schematically shows an example layout of an image of a video stream generated and displayed by the external vision and/or weapon aiming and firing system in FIG. 1.

For a better understanding of the present disclosure, FIG. 2 schematically shows an example layout of an image of the video stream displayed by the user interface 13.

In particular, FIG. 2 shows an image (indicated as a whole by reference numeral 2) that comprises an aiming reticle 21, which has a substantially cross-like shape and is positioned on a central region of said image 2. In addition, FIG. 2 also shows the above-stated predefined region (schematically represented by a broken-line square and indicated as a whole by reference numeral 22) of the image 2 in relation to which, in use, the above-stated automatic aiming reticle colour selection functionality is implemented by the electronic control unit 12. As shown in FIG. 2, the predefined region 22 is centred on the aiming reticle 21 and has a substantially square shape, the vertices of which are constituted by:

a first pixel 23 (top-left vertex) having coordinates, where I and J represent the indices that identify said first pixel 23 in the pixel matrix that forms the image 2;

a second pixel 24 (top-right vertex) having coordinates, where I+N and J represent the indices that identify said second pixel 24 in the pixel matrix that forms the image 2;

a third pixel 25 (bottom-right vertex) having coordinates (I+N, J+M), where I+N and J+M represent the indices that identify said third pixel 25 in the pixel matrix that forms the image 2; and a fourth pixel 26 (bottom-left vertex) having coordinates, where I and J+M represent the indices that identify said fourth pixel 26 in the pixel matrix that forms the image 2.

For example, the aiming reticle 21 can usefully have an overall height of 1 mrad (i.e. 1 milliradian) and an overall width of 1 mrad, while the predefined square-shaped region 22 can usefully have sides of 0.5 mrad.

With regard to this, it is important to note that the aiming reticle 21 could have a different shape and size with respect to those shown in FIG. 2. In fact, as is known, the shape and size of an aiming reticle must generally satisfy specific requirements (generally very strict) defined in specially provided national and/or international military standards (for example, NATO standards). Thus, the aiming reticle 21 can usefully have a different shape and size according to the reference standards taken into consideration.

Furthermore, also the predefined region 22 can usefully have a different shape and size with respect to those shown in FIG. 2 (for example said predefined region 22 could have a rectangular or circular shape).

According to a first preferred embodiment of the present disclosure, the video capture device 11 is designed to supply a video stream comprising colour images in which the colour of the pixels of said images is expressed in an RGB colour space in terms of red R, green G and blue B colour components.

Figure 3:
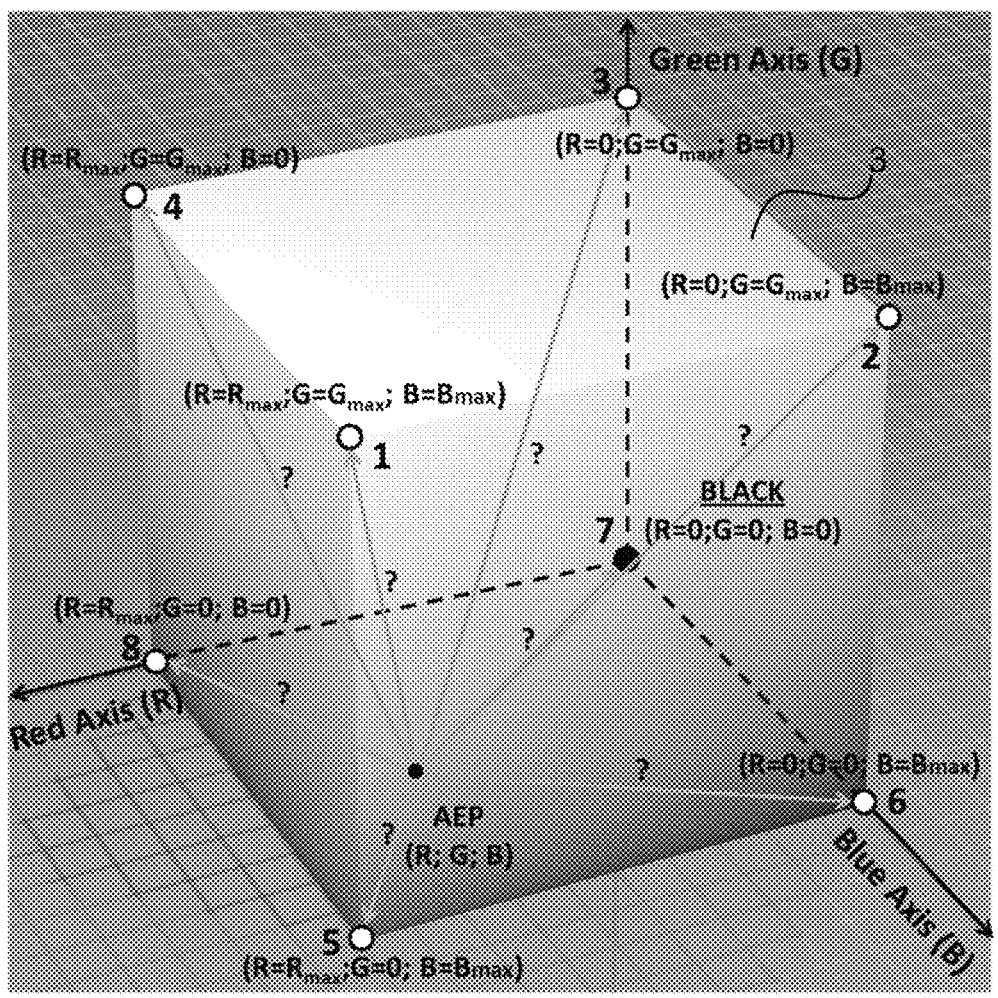
FIG. 3 schematically shows an RGB colour space.

With regard to this, FIG. 3 shows a three-dimensional representation of an example RGB colour space, in which the three Cartesian reference axes are related to the colour components R, G and B, and where the pixels can take colours inside an RGB colour cube 3 the vertices of which are constituted by:
  black with colour coordinates [R=0,G=0,B=0];
  red with colour coordinates [R=$R_{max}$,G=0,B=0];
  green with colour coordinates [R=0,G=$G_{max}$,B=0];
  blue with colour coordinates [R=0,G=0,B=$B_{max}$];
  white with colour coordinates [R=$R_{max}$,G=$G_{max}$, B=$B_{max}$];
  yellow with colour coordinates [R=$R_{max}$,G=$G_{max}$,B=0];
  magenta with colour coordinates [R=$R_{max}$,G=0,B=$B_{max}$]; and
  cyan with colour coordinates [R=0,G=$G_{max}$,B=$B_{max}$].

According to said first preferred embodiment of the present disclosure, the electronic control unit 12 is programmed to automatically change the colour of the aiming reticle 21 by performing the following operations:
  computing, for an image of the video stream acquired from the video capture device 11, average values of the colour components R, G and B of the pixels located in a predefined region (for example the above-stated predefined region 22) of said image, where said predefined region is centred on the aiming reticle;
  computing, for each vertex of the RGB colour cube 3, a respective distance from said vertex of a colour resulting from the average values of the colour components R, G and B of the pixels in the predefined region 22; and
  selecting, as the aiming reticle colour 21, the colour corresponding to the vertex of the RGB colour cube 3 having the maximum distance from the colour resulting from the average values of the colour components R, G and B of the pixels in the predefined region 22.

Furthermore, the electronic control unit 12 is opportunely programmed to not change the colour of the aiming reticle 21, in this way leaving it unaltered, if the colour resulting from the average values of the colour components R, G and B of the pixels in the predefined region 22 is within a predefined neighbourhood of the centre of the RGB colour cube 3.

Entering into said first preferred embodiment of the present disclosure in greater detail, the electronic control unit 12 is programmed to implement said automatic aiming reticle colour selection functionality by performing the following operations:
  computing average values $R_m$, $G_m$ and $B_m$ of the colour components R, G and B of all the pixels located in the predefined region 22 of the image 2, or, in mathematical terms:

$$AEP = [R_m, G_m, B_m] = \left[ \frac{\sum_{i=I}^{I+N} \sum_{j=J}^{J+M} R(i,j)}{(N+1)(M+1)}, \frac{\sum_{i=I}^{I+N} \sum_{j=J}^{J+M} G(i,j)}{(N+1)(M+1)}, \frac{\sum_{i=I}^{I+N} \sum_{j=J}^{J+M} B(i,j)}{(N+1)(M+1)} \right]$$

where AEP (Area-Equivalent Pixel) indicates the colour having colour coordinates [R=$R_m$,G=$G_m$,B=$B_m$] in the reference RGB colour space (in particular, with reference to the RGB colour space shown in FIG. 3, in the RGB colour cube 3);
  computing, for each vertex of the RGB colour cube 3, a respective distance of the AEP colour from said vertex, or, in mathematical terms:

$$D_1 = \sqrt[2]{(R_{max} - R_m)^2 + (G_{max} - G_m)^2 + (B_{max} - B_m)^2},$$

$$D_2 = \sqrt[2]{R_m^2 + (G_{max} - G_m)^2 + (B_{max} - B_m)^2},$$

$$D_3 = \sqrt[2]{R_m^2 + (G_{max} - G_m)^2 + B_m^2},$$

$$D_4 = \sqrt[2]{(R_{max} - R_m)^2 + (G_{max} - G_m)^2 + B_m^2},$$

$$D_5 = \sqrt[2]{(R_{max} - R_m)^2 + G_m^2 + (B_{max} + B_m)^2},$$

$$D_6 = \sqrt[2]{R_m^2 + G_m^2 + (B_{max} - B_m)^2},$$

$$D_7 = \sqrt[2]{R_m^2 + G_m^2 + B_m^2},$$

$$D_8 = \sqrt[2]{(R_{max} - R_m)^2 + G_m^2 + B_m^2};$$

selecting, as the aiming reticle colour 21, the colour corresponding to the vertex of the RGB colour cube 3 having the maximum distance from the AEP colour, or, in mathematical terms:

$$D_{max} = \max(D_1, D_2, D_3, D_4, D_5, D_6, D_7, D_8).$$

As previously mentioned, under certain special conditions the electronic control unit 12 might assign a different colour to the aiming reticle for each frame of the video stream, in this way creating fastidious colour jitter.

Therefore, in order to avoid this problem, the electronic control unit 12 is preferably programmed to:
  change the colour of the aiming reticle with the above-stated frequency fps/P, as previously described; and/or
  not change the aiming reticle colour (thus leaving it unaltered) if the AEP colour is within a predefined sphere of predetermined radius centred on the centre of the RGB colour cube 3; in fact, when the AEP colour is inside said predefined sphere, all the vertices of the RGB colour cube 3 are virtually equidistant from the AEP colour and so any change in the aiming reticle colour would not bring any evident benefit for an operator.

The electronic control unit 12 is expediently programmed to not change the aiming reticle colour (consequently leaving it unaltered) if the following colour jitter condition is satisfied:

$$\sqrt{\left(\frac{R_{max}}{2} - R_m\right)^2 + \left(\frac{G_{max}}{2} - G_m\right)^2 + \left(\frac{B_{max}}{2} - B_m\right)^2} < T_J,$$

where $T_J$ indicates a pre-set colour jitter threshold representing the above-stated predetermined radius of the predefined sphere centred on the centre of the RGB colour cube 3.

According to a second preferred embodiment of the present disclosure, the video capture device 11 is designed to supply a video stream comprising colour images in which the colour of the pixels of said images is expressed in an RGB colour space in terms of red R, green G and blue B colour components. For example, the above-stated predefined RGB colour space could be the known sRGB colour space.

Figure 4:
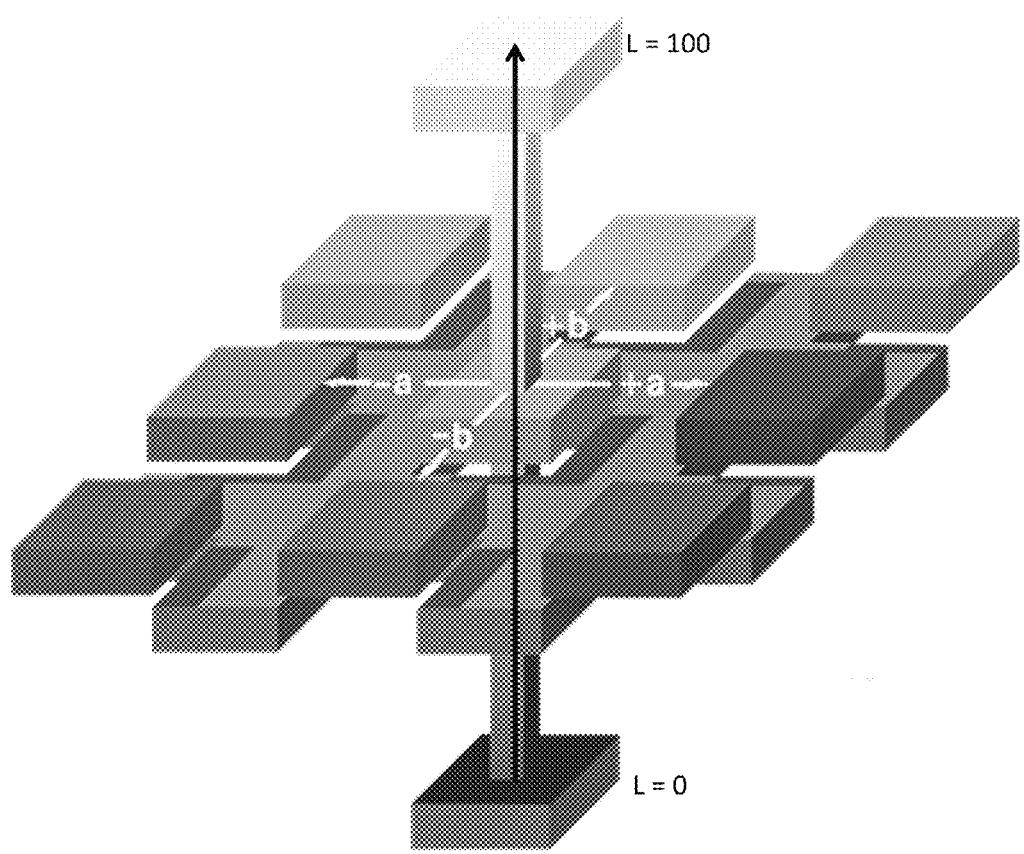
FIG. 4 schematically shows the CIE L*a*b* colour-opponent space.

Furthermore, according to said second preferred embodiment of the present disclosure, the electronic control unit 12 is programmed to implement said automatic aiming reticle colour selection functionality by performing the following operations:

applying a predefined linear transformation to the colour components R, G and B of the pixels located in the predefined region 22 of the image 2 so as to transform said colour components R, G and B into corresponding components expressed in the known CIE XYZ colour space (said linear transformation depending on the specific format of the above-stated predefined RGB colour space);

transforming the computed components X, Y and Z into corresponding components L*, a* and b* expressed in the known CIE L*a*b* (or CIELAB) colour-opponent space (with regard to this, FIG. 4 schematically illustrates the CIE L*a*b* colour-opponent space);

computing average values $L^*_m$, $a^*_m$ and $b^*_m$ of the computed components L*, a* and b*, or, in mathematical terms:

$$[L^*_m, a^*_m, b^*_m] = \left[ \frac{\sum_{i=I}^{I+N}\sum_{j=J}^{J+M} L^*(i,j)}{(N+1)(M+1)}, \frac{\sum_{i=I}^{I+N}\sum_{j=J}^{J+M} a^*(i,j)}{(N+1)(M+1)}, \frac{\sum_{i=I}^{I+N}\sum_{j=J}^{J+M} b^*(i,j)}{(N+1)(M+1)} \right];$$

and computing a colour saturation value, known as the Chroma value, C and a hue angle H based on the computed average values $a^*_m$ and $b^*_m$, by opportunely using the following mathematical formulas:

$$C = \sqrt{(a^*_m)^2 + (b^*_m)^2},$$

and $$H = \arctan\left(\frac{b^*_m}{a^*_m}\right),$$

with $H \in [-180°, 180°]$.

Figure 5:
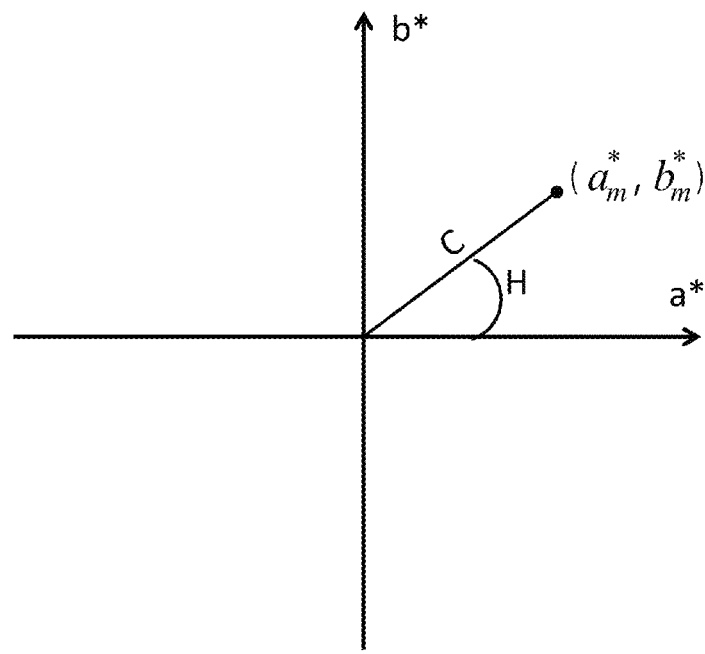
FIGS. 5 and 6 schematically show Cartesian planes defined by components a* and b* of the CIE L*a*b* colour-opponent space.

With regard to this, FIG. 5 shows a Cartesian plane defined by components a* (abscissas axes) and b* (ordinate axes) of the CIE L*a*b* colour-opponent space, where the trigonometric relation between the above-stated average values $a^*_m$ and $b^*_m$ and the Chroma value C and hue angle H is also shown.

Furthermore, always according to said second preferred embodiment of the present disclosure, the electronic control unit 12 is programmed to select the colour of the aiming reticle according to the logic described in detail hereinafter through the use of a kind of pseudo-programming language immediately comprehensible to a person skilled in the art:

if $L^*_m > W_T$, then white, having colour coordinates [$R_{max}$, $G_{max}$, $B_{max}$] in the aforesaid predefined RGB colour space, is assigned to the aiming reticle 21;

otherwise if $L^*_m < B_T$, then black, having colour coordinates [0,0,0] in the aforesaid predefined RGB colour space, is assigned to the aiming reticle 21;

otherwise if $C < C_T$ and $L^*_m < 50$, then white, having colour coordinates [$R_{max}$, $G_{max}$, $B_{max}$] (for example [255,255,255]) in the aforesaid predefined RGB colour space, is assigned to the aiming reticle 21, if $C < C_T$ and $L^*_m \geq 50$, then black, having colour coordinates [0,0,0] in the aforesaid predefined RGB colour space, is assigned to the aiming reticle 21, if $C > C_T$, H≥−50° and H<+15°, then green, having colour coordinates [0,$G_{max}$,0] (for example [0,255,0]) in the aforesaid predefined RGB colour space, is assigned to the aiming reticle 21, if $C > C_T$, H≥+15° and H<+85°, then cyan, having colour coordinates [0,$G_{max}$,$B_{max}$] (for example [0,255,255]) in the aforesaid predefined RGB colour space, is assigned to the aiming reticle 21, if $C > C_T$, H≥+85° and H<+95°, then cyan, having colour coordinates [0,$G_{max}$,$B_{max}$] (for example [0,255,255]) in the aforesaid predefined RGB colour space, is assigned to the aiming reticle 21, if $C > C_T$, H≥+95° and H≤+180°, then magenta, having colour coordinates [$R_{max}$,0,$B_{max}$] (for example [255,0,255]) in the aforesaid predefined RGB colour space, is assigned to the aiming reticle 21, if $C > C_T$, H>−180° and H<−50°, then orange, having, for example, colour coordinates [255,25,0] in the aforesaid predefined RGB colour space, is assigned to the aiming reticle 21;

where $W_T$ indicates a relative threshold for the colour white, $B_T$ indicates a relative threshold for the colour black and $C_T$ indicates a relative threshold for the Chroma value C, said thresholds $W_T$, $B_T$ and $C_T$ being operator settable.

In other words, the electronic control unit 12 selects the colour of the aiming reticle 21 by subdividing the plane defined by components a* and b* shown in FIG. 5 into several circular sectors, each of which is defined by a respective range of hue angle values and is associated with a corresponding colour, and assigning to the aiming reticle 21 the colour of circular sector corresponding to a hue angle value that is (approximately) equal to H+180°, so as to maximize the colour contrast between the aiming reticle 21 and the predefined region 22.

Figure 6:
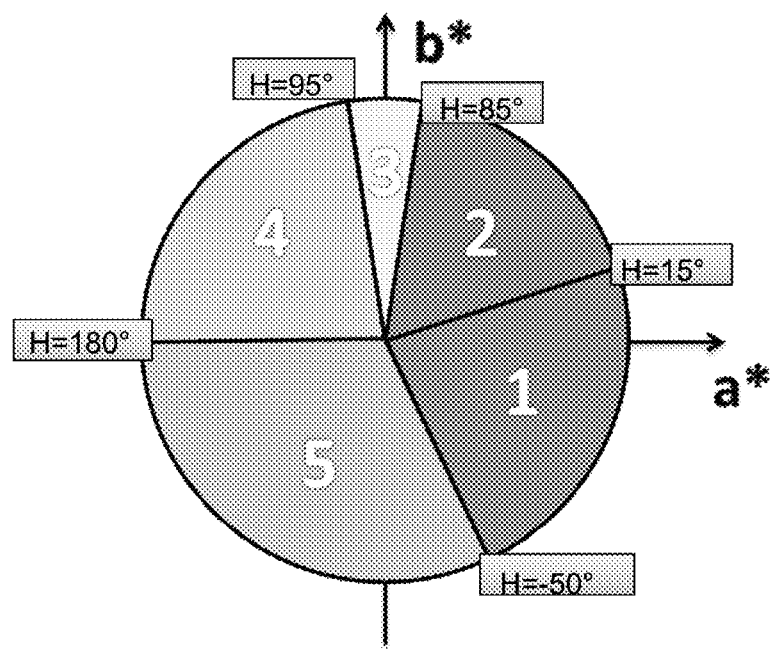

With regard to this, FIG. 6 shows, in the Cartesian plane defined by components a* and b* of the CIE L*a*b* colour-opponent space, the different sectors that are identified through the hue angle H and which include:

a first sector defined by hue angle values ranging between −50° and +15° and associated with the colour magenta;

a second sector defined by hue angle values ranging between +15° and +85° and associated with the colour orange;

a third sector defined by hue angle values ranging between +85° and +95° and associated with the colour yellow;

a fourth sector defined by hue angle values ranging between +95° and +180° and associated with the colour green; and a fifth sector defined by hue angle values ranging between −180° and −50° and associated with the colour cyan.

Therefore, in accordance with that previously described in relation to second preferred embodiment of the present disclosure and with reference to FIG. 6, the electronic control unit 12 selects the colour of the aiming reticle 21 in the following manner:

if −50°≤H<+15° (first sector associated with the colour magenta), then green is assigned to the aiming reticle 21;

if +15°≤H<+85° (second sector associated with the colour orange), then cyan is assigned to the aiming reticle 21;

if +85°≤H<+95° (third sector associated with the colour yellow), then cyan is assigned to the aiming reticle 21;

if +95°≤H<+180° (fourth sector associated with the colour green), then magenta is assigned to the aiming reticle 21; and, if −180°<H<−50° (fifth sector associated with the colour cyan), then orange is assigned to the aiming reticle 21.

As previously mentioned, under certain special conditions the electronic control unit 12 might assign a different colour to the aiming reticle for each frame of the video stream, in this way creating fastidious colour jitter.

Therefore, in order to avoid this problem, the electronic control unit 12 is preferably programmed to:
  change the colour of the aiming reticle with the above-stated frequency fps/P, as previously described; and/or
  update the colour of the aiming reticle only if the following condition is satisfied:

$$|\Delta E| \geq T_E,$$

where $\Delta E$ indicates the colour difference between two predefined regions of two immediately consecutive frames k−1 and k in the video stream and $T_E$ indicates a predefined colour difference threshold; said colour difference $\Delta E$ could be opportunely calculated via the following mathematical expression:

$$\Delta E = E_k - E_{k-1} = \sqrt{(L^*_{m_k} - L^*_{m_{k-1}})^2 + (a^*_{m_k} - a^*_{m_{k-1}})^2 + (b^*_{m_k} - b^*_{m_{k-1}})^2}.$$

The CIE L*a*b* colour-opponent space has the advantage of being independent of the type of video capture device 11 utilized.

Moreover, the non-linear relations between the components L*, a* and b* are such as to replicate the non-linear response of the human eye. Furthermore, uniform variations in the components L*, a* and b* correspond to uniform variations in the perceived colour; in this way, the differences, from the human perception viewpoint, between any two colours in the CIE L*a*b* colour-opponent space can be approximated by considering each colour as a point in a three-dimensional space defined by the three components L*, a* and b*, and by evaluating the Euclidean distance between the two colours. In this way, it is possible to unequivocally determine the aforesaid colour difference $\Delta E$ and establish that:
  if $\Delta E < 0.2$, the colour difference is not perceptible;
  if $0.2 < \Delta E < 0.5$, the colour difference is very small;
  if $0.5 < \Delta E < 2$, the colour difference is small;
  if $2 < \Delta E < 3$, the colour difference is barely perceptible;
  if $3 < \Delta E < 6$, the colour difference is fairly distinguishable;
  if $6 < \Delta E < 12$, the colour difference is large; and,
  if $\Delta E > 12$, the two colours $E_k$ and $E_{k-1}$ are different, where it should be remembered that $$\Delta E = E_k - E_{k-1} = \sqrt{(L^*_{m_k} - L^*_{m_{k-1}})^2 + (a^*_{m_k} - a^*_{m_{k-1}})^2 + (b^*_{m_k} - b^*_{m_{k-1}})^2}.$$

The capability of being able to unequivocally distinguish the colour difference between two regions of pixels around the aiming reticle of two immediately consecutive frames k−1 and k enables updating the colour of the aiming reticle in an optimized manner, i.e. only when said colour difference is considerable for an operator, or rather is perceptible by the latter, in this way eliminating fastidious colour jitter. Moreover, this criterion can also be opportunely applied to the first embodiment of the disclosure for reducing colour jitter in the case of the algorithm based on RGB colour space.

According to the above-stated second embodiment of the present disclosure, the assignment of the colour to the aiming reticle takes place according to a contrast optimization logic that does not ignore the qualitative factor for the operator. By acting on the various thresholds, the algorithm could also be opportunely adapted to respond to all possible operational scenarios. In fact, by opportunely adjusting the thresholds, it is possible to favour the assignment of bright colours with respect to white and black. This choice is particularly advantageous in the case of scenes that are unvarying and/or with little contrast, where white or black aiming reticles are not very comfortable for an operator.

From the foregoing description, the technical advantages of the present disclosure are immediately evident.

In particular, it is important to note that the external vision and/or weapon aiming and firing system according to the two aforesaid preferred embodiments of the present disclosure enable an operator to always work under the best possible visual conditions, sparing the operator from having to manually select/set the colour of the aiming reticle and consequently eliminates any delay due to this selection/setting. In this way, the time necessary for tracking and, if necessary, engaging a hostile target and/or an element of interest is minimized. In other words, the external vision and/or weapon aiming and firing system according to the aforesaid preferred embodiments of the present disclosure ensure high efficiency in tracking and/or engaging possibly hostile targets.

Finally, it is important to underline yet again that the external vision and/or weapon aiming and firing system according to the two aforesaid preferred embodiments of the present disclosure can be advantageously exploited on board military land vehicles, military aircraft and military naval units. Furthermore, it is important to note that the present disclosure can be advantageously exploited with all types of indirect external vision systems based on optoelectronic video-capture devices.

In the light of what has been described and explained in the foregoing, it is considered that both of the aforesaid preferred embodiments of the present disclosure are unequivocally novel and inventive with respect to the systems of the known art, in particular with respect to the system described in FR 2 699 658 A1. Moreover, the two aforesaid preferred embodiments of the present disclosure can each be used independently of the other and each has respective distinctive characteristics. The applicant thus considers that each of the two aforesaid preferred embodiments of the present disclosure merit protection independently of the other preferred embodiment.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An external vision and/or weapon aiming and firing system configured to be installed on board a military land vehicle and/or a military aircraft and/or a military naval unit, and comprising:
  a video capture device configured to capture a video stream of a scene outside the military land vehicle or the military aircraft or the military naval unit, said video stream comprising a sequence of colour images, wherein the images include pixels with respective colours expressed in a predefined RGB colour space in terms of red, green and blue colour components;
  an electronic control unit connected to the video capture device to acquire the video stream captured by the latter and configured to insert an aiming reticle in the images of said video stream that indicates aiming of the video capture device and/or of a weapon installed on board the military land vehicle or the military aircraft or the military naval unit, thereby generating a corresponding output video stream; and a user interface connected to the electronic control unit to receive the output video stream generated by the latter and which is configured to display the received video stream;

wherein the electronic control unit is configured to:

automatically change a colour of the aiming reticle by performing the following operations:

transforming, for each image of the video stream acquired from the video capture device, the red, green and blue colour components of pixels located in a predefined region of said image into components L*, a* and b* expressed in the CIE L*a*b* colour-opponent space, wherein said predefined region is centred on the aiming reticle, computing average values of the components L*, a* and b* of the pixels in the predefined region, computing a colour saturation value and a hue angle on the basis of the average values of the components a* and b* of the pixels in the predefined region, and selecting the colour of the aiming reticle on the basis of the computed colour saturation value, of the computed hue angle and of the average value of components L* of the pixels in the predefined region, so as to maximize colour contrast between said aiming reticle and the predefined region;

compute a value indicative of a colour difference between the predefined regions of two or more immediately consecutive images in the video stream acquired from the video capture device on the basis of the average values of the components L*, a* and b* of the pixels in said predefined regions; and change the colour of the aiming reticle only if the value indicative of said colour difference is equal to, or greater than, a predefined threshold.

2. The system of claim 1, wherein the electronic control unit is configured to select a colour having maximum contrast with respect to a colour resulting from the computed hue angle as the colour of the aiming reticle, thereby maximizing the contrast between the aiming reticle and said predefined region.

3. The system according to claim 1, wherein the value indicative of said colour difference is indicative of a Euclidean distance between the average values of the components L*, a* and b* of the pixels in the predefined regions of the two or more immediately consecutive images in the video stream acquired from the video capture device; and wherein said predefined threshold is indicative of a user-perceptible colour difference.

4. The system according to claim 1, wherein the electronic control unit is configured to change the colour of the aiming reticle with a refresh rate of the colour of the aiming reticle lower than a frame rate of the video stream acquired from the video capture device.

5. An electronic unit for an external vision and/or weapon aiming and firing system of a military land vehicle and/or a military aircraft and/or a military naval unit, wherein said external vision and/or weapon aiming and firing system comprises:

a video capture device configured to capture a video stream of a scene outside the military land vehicle or the military aircraft or the military naval unit, said video stream comprising a sequence of colour images, wherein the images include pixels with respective colours expressed in a predefined RGB colour space in terms of red, green and blue colour components; and a user interface;

wherein said electronic unit is:

configured to be connected to the video capture device to acquire the video stream captured by the latter;

configured to insert an aiming reticle in the images of the acquired video stream that indicates aiming of the video capture device and/or of a weapon installed on board the military land vehicle or the military aircraft or the military naval unit, thereby generating a corresponding output video stream;

configured to be connected to the user interface to provide the latter with the output video stream; and configured to:

automatically change a colour of the aiming reticle by performing the following operations:

transforming, for each image of the video stream acquired from the video capture device, the red, green and blue colour components of pixels located in a predefined region of said image into components L*, a* and b* expressed in the CIE L*a*b* colour-opponent space, wherein said predefined region is centred on the aiming reticle, computing average values of the components L*, a* and b* of the pixels in the predefined region, computing a colour saturation value and a hue angle on the basis of the average values of the components a* and b* of the pixels in the predefined region, and selecting the colour of the aiming reticle on the basis of the computed colour saturation value, of the computed hue angle and of the average value of components L* of the pixels in the predefined region, so as to maximize colour contrast between said aiming reticle and the predefined region;

compute a value indicative of a colour difference between the predefined regions of two or more immediately consecutive images in the video stream acquired from the video capture device on the basis of the average values of the components L*, a* and b* of the pixels in said predefined regions; and change the colour of the aiming reticle only if the value indicative of said colour difference is equal to, or greater than, a predefined threshold.

6. A non-transitory computer-readable medium comprising software and/or firmware code portions executable by an electronic unit of an external vision and/or weapon aiming and firing system of a military land vehicle and/or a military aircraft and/or a military naval unit, wherein said external vision and/or weapon aiming and firing system comprises:

a video capture device configured to capture a video stream of a scene outside the military land vehicle or the military aircraft or the military naval unit, said video stream comprising a sequence of colour images, wherein the images include pixels with colours expressed in a predefined RGB colour space in terms of red, green and blue colour components; and a user interface;

wherein said electronic unit is:

connected to the video capture device to acquire the video stream captured by the latter;

configured to implement, when controlled by the software and/or firmware code portions, to implement a method comprising:

inserting an aiming reticle in the images of the acquired video stream that indicates aiming of the video capture device and/or of a weapon installed on board the military land vehicle or the military aircraft or the military naval unit, thereby generating a corresponding output video stream; and providing the user interface with the output video stream;

automatically changing a colour of the aiming reticle by performing the following operations:

transforming, for each image of the video stream acquired from the video capture device, the red, green and blue colour components of pixels located in a predefined region of said image into components $L^*$, $a^*$ and $b^*$ expressed in the CIE $L^*a^*b^*$ colour-opponent space, wherein said predefined region is centred on the aiming reticle, computing average values of the components $L^*$, $a^*$ and $b^*$ of the pixels in the predefined region, computing a colour saturation value and a hue angle on the basis of the average values of the components $a^*$ and $b^*$ of the pixels in the predefined region, and selecting the colour of the aiming reticle on the basis of the computed colour saturation value, of the computed hue angle and of the average value of components $L^*$ of the pixels in the predefined region, so as to maximize colour contrast between said aiming reticle and the predefined region;

computing a value indicative of a colour difference between the predefined regions of two or more immediately consecutive images in the video stream acquired from the video capture device on the basis of the average values of the components $L^*$, $a^*$ and $b^*$ of the pixels in said predefined regions; and changing the colour of the aiming reticle only if the value indicative of said colour difference is equal to, or greater than, a predefined threshold.

7. A military land vehicle comprising the external vision and/or weapon aiming and firing system claimed in claim 1.

8. A military aircraft comprising the external vision and/or weapon aiming and firing system claimed in claim 1.

9. A military naval unit comprising the external vision and/or weapon aiming and firing system claimed in claim 1.

\* \* \* \* \*